United States Patent [19]
Ryder

[11] 3,978,999
[45] Sept. 7, 1976

[54] CONTAINER DISCHARGE DAMAGE REDUCTION FLAP
[75] Inventor: James J. Ryder, Santee, Calif.
[73] Assignee: Rohr Plessey Corporation, Rockville, Md.
[22] Filed: Nov. 8, 1974
[21] Appl. No.: 522,033

[52] U.S. Cl. .............................. 214/314; 214/302; 214/307
[51] Int. Cl.² ........................................ B65G 65/04
[58] Field of Search ............ 214/302, 303, 307, 312, 214/314

[56] References Cited
UNITED STATES PATENTS

| | | | |
|---|---|---|---|
| 1,085,904 | 2/1914 | Graves | 214/307 |
| 1,973,767 | 9/1934 | Kimball et al. | 214/307 |
| 2,260,697 | 10/1941 | Allen | 214/314 |

Primary Examiner—Robert J. Spar
Assistant Examiner—Lawrence J. Oresky
Attorney, Agent, or Firm—P. J. Schlesinger; C. C. Logan, II

[57] ABSTRACT

A hamper dumper having a base frame, a cradle pivotally attached to the base frame, and a chute assembly pivotally attached to the base frame. The cradle is designed to receive a hamper loaded with parcels that is to be unloaded. A first hydraulic motor has its one end pivotally secured to the base frame and its other end pivotally secured to the cradle for rotating the cradle from a loaded to an unloaded position. The chute assembly functions as a cover for the top of the hamper while it is travelling from an upright position to an inverted position. Thereafter a second hydraulic motor rotates the chute assembly an additional arcuate distance to allow for controlled discharge of the parcels within the hamper. Locking means in the cradle prevents the hamper from falling during its inverted period.

3 Claims, 5 Drawing Figures

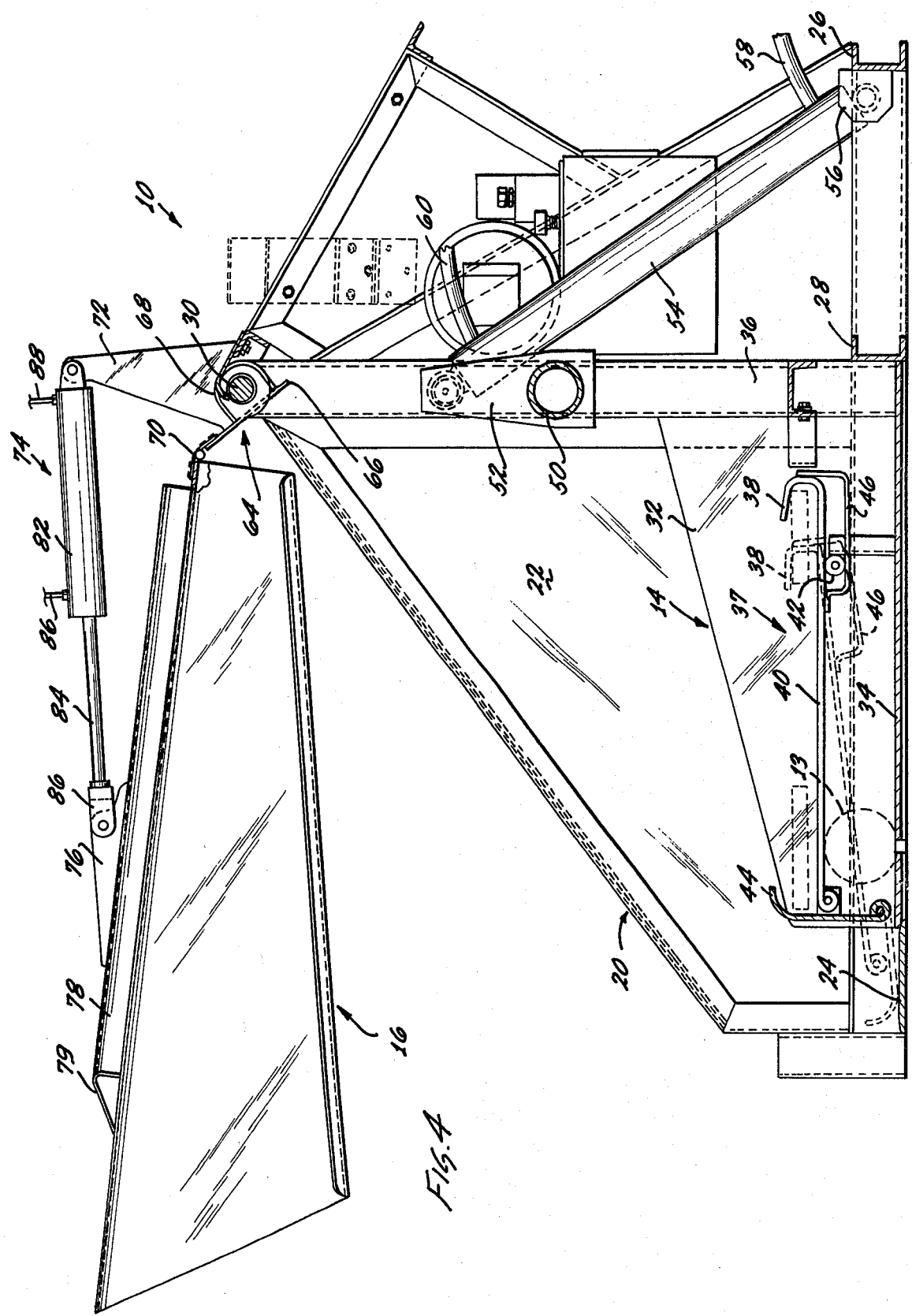

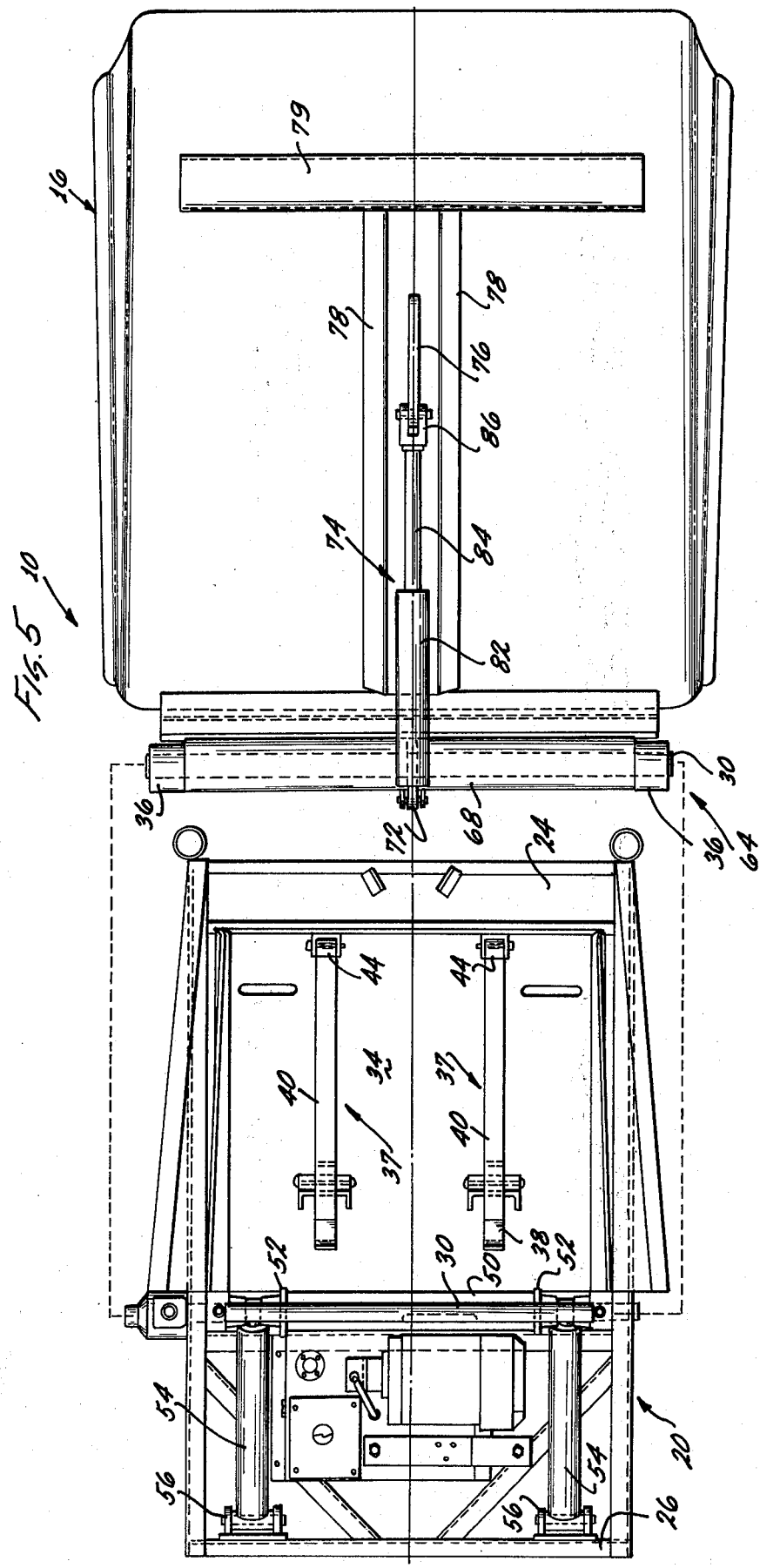

CONTAINER DISCHARGE DAMAGE REDUCTION FLAP

BACKGROUND OF THE INVENTION

The invention relates generally to a hamper dumper and more specifically to auxiliary structure for controlling the discharge of parcels therefrom. In the past the unloading of a full hamper has presented a major problem in the handling of the contents within the hamper. Although the basic desire was to unload the hamper as quickly as possible, it frequently resulted in damage to the parcels. An example of a prior method was to put the hamper in a hamper dumper apparatus that would pivot the hamper from an upright position to an inverted position. This resulted in an excessive drop height for the parcels and produced an unreasonable amount of parcel damage. An alternative prior method to prevent this resulting parcel damage was for individual workers to physically unload the parcels piece by piece. This method was quite slow and expensive. Due to the size of the hampers and the weight of a full load of parcels two or more workers could physically lift and tilt a hamper to unload it. This method was faster than the manual unloading of the hamper but remains inefficient and costly due to the need for several workers to physically lift and tilt the hampers. This last method while reducing the excessive drop height of the parcels still did not prevent parcel damage since they were still tumbling and dropping out of the hamper. An example of where this unloading problem exists is in the handling of parcels in post office operations. The need here is for fast and expeditious handling of the parcels and yet the change for damage to the parcels has to be minimized. This type of problem additionally exists in other environments such as warehousing operations, shipping departments, etc.

It is an object of the invention to provide a hamper dumper that can control the discharge of parcels from a hamper when it is being dumped.

It is also an object of the invention to provide a hamper dumper that can prevent drop damage to articles being discharged from a hamper when it is being dumped.

SUMMARY OF THE INVENTION

The hamper dumper with its novel chute assembly prevents parcels from being dropped from an excessive height and also in one bunch which results in excessive parcel damage. The parcels are released in a controlled manner so that parcel damage is greatly reduced. In operation, a full hamper is rolled into the hamper dumper and secured to the bottom floor of the cradle. The chute assembly is then pivotally lowered to cover the open top of the hamper. Next a first hydraulic motor is actuated to pivotally lift the cradle and hamper to an inverted position while the chute assembly continues to cover the open top of the hamper. At a predetermined time the operator actuates a second hydraulic motor to pivot the chute assembly through an additional arc allowing the parcels contained in the hamper to be discharged in a controlled manner and allowing them to slide down the chute to an awaiting conveyor. The substantially vertical lateral side walls function to guide the parcels down to the awaiting conveyor. If desired, the arcuate motion of the chute assembly can be halted in a horizontal position to permit the operator to perform culling or inspection functions. After the hamper is completely unloaded the first hydraulic motor is actuated to pivot the cradle back to its original position. The empty hamper can then be rolled out of the hamper dumper and a new full hamper inserted to start the cycle again.

DESCRIPTION OF THE DRAWINGS

FIG. 4 is a side elevation view illustrating portions of the hamper dumper in cross-section.

FIG. 5 is an exploded top plan view of the hamper dumper.

DESCRIPTION OF THE PREFERRED EMBODIMENT

Figure 1:
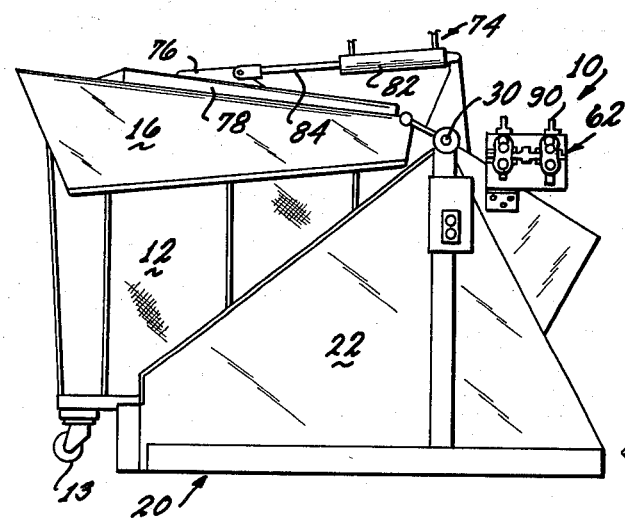
FIG. 1 is a side elevation view illustrating a full hamper just loaded into the hamper dumper.
Figure 2:
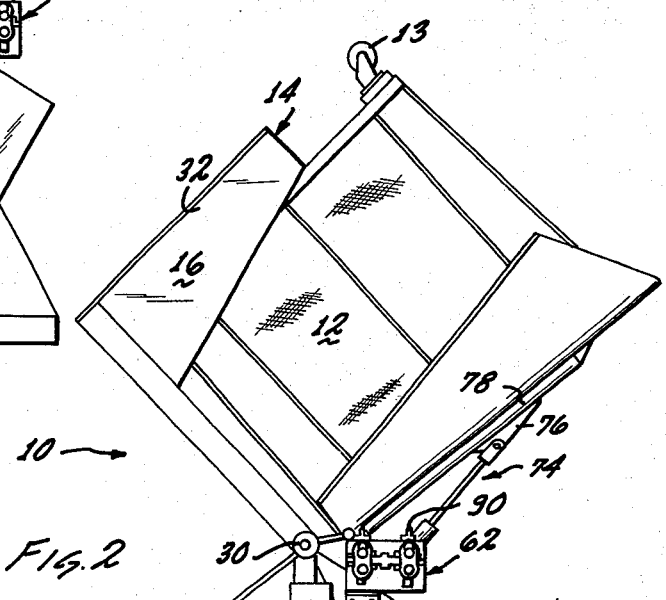
FIG. 2 is a side elevation view illustrating the full hamper in an inverted position prior to unloading.
Figure 3:
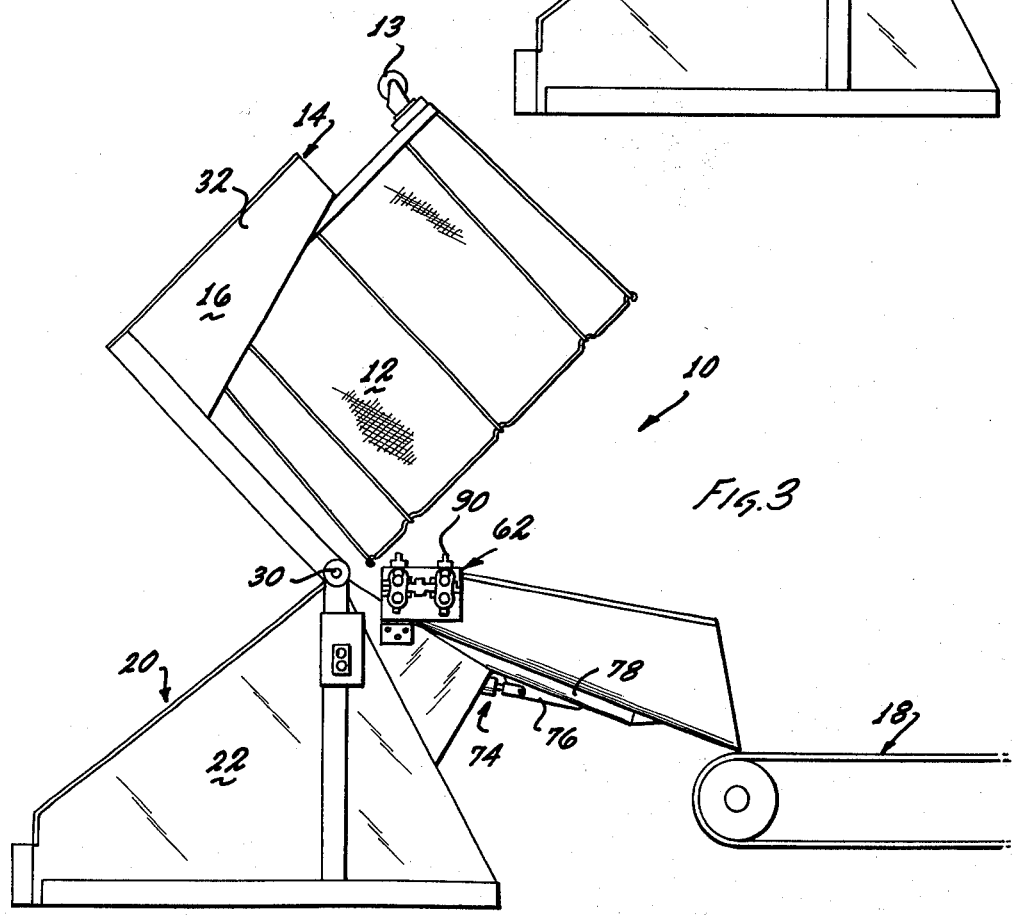
FIG. 3 is a side elevation view illustrating the chute assembly in its unloading position.

Referring to FIGS. 1-3 the improved hamper dumper is illustrated in various stages of operation. In FIG. 1 the hamper dumper generally designated by numeral 10 is illustrated with a full hamper 12 loaded upon the floor of cradle 14. Chute 16 is shown covering the open top of hamper 12. Looking to FIG. 2, the hamper has been rotated upwardly to an inverted position with chute 16 still covering the open top of the hamper. In FIG. 3 the hamper remains in the inverted position while the chute has been pivoted downwardly to allow the parcels contained therein to slide down onto conveyor belt 18. The downward pivotal movement of the chute 16 can be controlled to stop it at any predetermined angle. This allows the operator to control the flow of parcels from the hamper and to prevent damage to them which had previously been the problem due to their falling from an excessive height during the unloading operation.

The structure of the hamper dumper is best described by referring to FIGS. 4 and 5. Hamper dumper 10 is basically comprised of cradle 14, chute assembly 16, and base frame 20. Base frame 20 has upstanding side walls 22, a structural cross member 24 at the front end of the frame that functions as a ramp when rolling the hamper into cradle 14, and a pair of cross members 26 and 28 at the rear end and intermediate area respectively of the base frame. A shaft 30 is mounted at the top of side walls 22 and extends therebetween.

Cradle 14 comprises a pair of side walls 32, a bottom plate 34, and a pair of upstanding arms 36 that are journaled adjacent their tips on shaft 30. Mounted on the bottom plate 34 is a strap and latch mechanism 36 that functions to grip the bottom of the hamper once it has been position on the cradle. The manner in which the strap and latch mechanism operates will now be described.

The hamper which is to be rolled into the cradle has a pair of floor cross members 11 located beneath the bottom of the hamper and spaced upwardly from floor level by casters 13. As the hamper is rolled onto the cradle bottom plate 34 the forward edge of one of the hamper floor cross members 11 is engaged by hamper gripping fingers 38. Continued forward motion of the hamper into the cradle causes connecting straps 40 to be cammed up over rollers 42 and results in hamper gripping fingers 44 to be pivoted upwardly to a vertical position where they grip the rear hamper floor cross member 11. The hamper is then firmly secured to the bottom of the cradle thus preventing the hamper from falling out of the cradle when the cradle is rotated upwardly into an inverted position. Bracket 46 prevents the connecting strap from rolling off of roller 42 when the hamper is removed from the cradle. The strap and latch mechanism and its manner of gripping the bottom of a hamper are illustrated in phantom lines in FIG. 4.

The structure which allows the cradle to be rotated above the base frame will be described by referring to FIG. 4. A structural cross member 50 extends between cradle arms 36 and spaced inwardly from the opposite side walls it has brackets that extend outwardly parallel to the side walls. Having one end pivotally attached to brackets 52 and boss members extending outwardly from cradle arm 36 are a pair of hydraulic cylinder motors 54. The opposite ends of the hydraulic cylinder motors are pivotally attached to U-shaped brackets 56 that are mounted upon cross bridge 26. The hydraulic cylinder motors are of a well known type having a piston that reciprocates up and down within the cylinder in response to hydraulic fluid that is pumped into the cylinder either through tube 58 or tube 60. When fluid is pumped in through tube 58 the piston rod attached to the piston in motor 54 will be forced upwardly causing the cradle 14 to be rotated upwardly to an inverted position. Conversely when fluid is directed into motor 54 through tube 60 the cradle will be returned to its loading position. The hydraulic valve for raising and lowering the cradle is illustrated in FIG. 1. and is generally designated by numeral 62.

The chute assembly 15 is attached to the base frame 20 and cradle 14 by the chute pivot assembly 64. The chute pivot assembly is comprised of a transverse plate 66 that extends between the cradle arm 36 with a U-shaped stiffener member 68 secured to the transfer plate. The opposite ends of the U-shaped stiffener member are welded to the cradle arm so that they pivot as one member. Also extending transversely with plate 66 is hinge assembly 70 that has its one end attached to the bottom of chute 16. A crank arm 72 extends perpendicular to transverse plate 66. An actuator assembly 74 has its one end attached to the upper tip of crank arm 72 and its other end attached to bracket 76 that is in turn secured to channel stiffener 78 on the bottom surface of chute 16. Transverse member 79 also functions as a structural stiffener member. The chute member 16 has side walls 17 that function to guide the parcels as they flow down the chute from the hamper.

Actuator assembly 74 consists of a hydraulic motor 82 having a piston rod 84 whose one end is secured to bifurcated member 86 that is pivotally attached to bracket 76. Referring to FIGS. 2 and 3 it is illustrated how the actuator assembly lowers the chute assembly when fluid is pumped through tube 86 and raised when fluid is pumped through tube 88. Valve 90 is manually actuated to control the flow of fluid through tubes 86 and 88.

What is claimed is:

1. A hamper dumper comprising:

a base frame, a cradle having means to receive a hamper that is to be unloaded, means pivotally attaching said cradle to said base frame, means for pivoting said cradle with respect to said base frame from a loading position to a dumping position, a chute assembly that functions as a cover for the top of a hamper when it is positioned on said cradle, said cradle and said chute assembly are attached to each other so that they normally pivot together as one member with respect to said base frame, a chute pivot assembly for pivotally attaching said chute assembly to said frame, said chute assembly comprising:

a chute, a hinge assembly connecting said chute to said chute pivot assembly, an actuator assembly for pivoting said chute about said hinge assembly, said means for pivoting said cradle with respect to said base frame comprising:

first motor means having one end pivotally secured to said base frame and its other end pivotally secured to said cradle, said motor means comprising a hydraulic cylinder with piston reciprocally mounted therein, and said cradle having upstanding arms that are pivotally secured adjacent their tips to a shaft fixedly attached to said base frame, said chute pivot assembly comprising a transverse plate secured to the bottom surfaces of a U-shaped stiffener with said shaft passing longitudinally within said enclosure formed by said transverse plate and said U-shaped stiffener, the ends of transverse plate and said U-shaped stiffener being fixedly secured to said upstanding arms whereby said cradle and said chute pivot assembly as a single member.

2. A hamper dumper as recited in claim 1 wherein said actuator assembly comprises a crank arm having one end secured at an angle perpendicular to said transverse plate, second motor means having one end pivotally secured to said chute.

3. A hamper dumper as recited in claim 1 further comprising:

means for locking a hamper in said cradle while it is being pivotally tipped upside down.

* * * * *